(12) United States Patent
Byun et al.

(10) Patent No.: US 8,691,424 B2
(45) Date of Patent: Apr. 8, 2014

(54) RECHARGEABLE BATTERY

(75) Inventors: Sang-Won Byun, Yongin-si (KR); Jong-Seok Moon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 320 days.

(21) Appl. No.: 12/856,933

(22) Filed: Aug. 16, 2010

(65) Prior Publication Data

US 2011/0200849 A1 Aug. 18, 2011

Related U.S. Application Data

(60) Provisional application No. 61/305,888, filed on Feb. 18, 2010.

(51) Int. Cl.
*H01M 2/00* (2006.01)

(52) U.S. Cl.
USPC .......................................... 429/163; 429/164

(58) Field of Classification Search
USPC ............................................................. 429/61
See application file for complete search history.

(56) References Cited

U.S. PATENT DOCUMENTS

| | | | |
|---|---|---|---|
| 5,326,653 A | 7/1994 | Chang | |
| 5,534,369 A | 7/1996 | Nagaura | |
| 5,800,937 A | 9/1998 | Decker et al. | |
| 5,824,120 A | 10/1998 | Mitchell et al. | |
| 6,342,826 B1 * | 1/2002 | Quinn et al. ................. | 337/300 |
| 7,060,388 B2 | 6/2006 | Naruoka | |
| 2002/0034685 A1 | 3/2002 | Sato et al. | |
| 2003/0044677 A1 | 3/2003 | Naruoka | |
| 2003/0129479 A1 | 7/2003 | Munenaga et al. | |
| 2004/0265700 A1 | 12/2004 | Ugawa et al. | |
| 2005/0118499 A1 | 6/2005 | Kim | |
| 2005/0257431 A1 | 11/2005 | Yamaguchi | |
| 2006/0051667 A1 * | 3/2006 | Kim ............................... | 429/184 |
| 2006/0121341 A1 | 6/2006 | Hosoda et al. | |
| 2007/0166605 A1 * | 7/2007 | Meguro et al. .................. | 429/61 |
| 2007/0224496 A1 * | 9/2007 | Woo .............................. | 429/144 |
| 2009/0092889 A1 | 4/2009 | Hwang et al. | |

(Continued)

FOREIGN PATENT DOCUMENTS

| | | |
|---|---|---|
| EP | 0 780 920 A1 | 6/1997 |
| EP | 2 048 736 A1 | 4/2009 |

(Continued)

OTHER PUBLICATIONS

KIPO Office action dated Aug. 18, 2011 in Korean application No. 10-2010-0054502, pp. 1-4.

(Continued)

*Primary Examiner* — Ula C Ruddock
*Assistant Examiner* — Archer Dudley
(74) *Attorney, Agent, or Firm* — Christie, Parker & Hale, LLP

(57) ABSTRACT

A rechargeable battery includes an electrode assembly comprising a first electrode plate, a second electrode plate, and a separator located between the first and second electrode plates; a case housing the electrode assembly; and at least one short circuit inducing member electrically coupled to the first electrode plate or the second electrode plate of the electrode assembly and adapted to induce a short circuit in the rechargeable battery when the shape of the rechargeable battery is changed.

12 Claims, 5 Drawing Sheets

(56) References Cited

U.S. PATENT DOCUMENTS

| | | | |
|---|---|---|---|
| 2009/0317665 A1 | 12/2009 | Maeng et al. | |
| 2010/0143789 A1* | 6/2010 | Kim | 429/163 |
| 2010/0279160 A1 | 11/2010 | Lee et al. | |
| 2010/0279170 A1* | 11/2010 | Lee et al. | 429/178 |

FOREIGN PATENT DOCUMENTS

| | | |
|---|---|---|
| JP | 08-153542 | 6/1996 |
| JP | 10-326610 | 12/1998 |
| JP | 11-086844 | 3/1999 |
| JP | 2001-524255 | 11/2001 |
| JP | 2002-093402 | 3/2002 |
| JP | 2003-142068 | 5/2003 |
| JP | 2006-222077 | 8/2006 |
| JP | 2007-214106 | 8/2007 |
| JP | 2008-41264 A | 2/2008 |
| JP | 2008-130458 | 6/2008 |
| JP | 2009-94068 | 4/2009 |
| JP | 2010-003690 | 1/2010 |
| JP | 2011-049147 | 3/2011 |
| KR | 2002-0018961 | 3/2002 |
| KR | 10-2004-0079316 | 9/2004 |
| KR | 10-0875607 | 12/2008 |
| KR | 10-0876268 B1 | 12/2008 |
| KR | 10-0905390 | 6/2009 |
| KR | 10-2009-0132926 | 12/2009 |

OTHER PUBLICATIONS

EP Examination report dated Apr. 21, 2011, for corresponding European Patent Application No. 10 168 818.2-1227, 6 pages.
Patent Abstracts of Japan and English machine translation for publication No. JP 10-326610 dated Dec. 8, 1998 in the name of Kobayashi.
Extended European Search Report dated Oct. 15, 2010 in corresponding European application No. 10168818.2.
Japanese Office action dated Aug. 28, 2012 for Japanese Patent application 2010-131517, (2 pages).
Patent Abstract of Japan, and English machine translation of Japanese Publication 08-153542, (30 pages).
Patent Abstract of Japan, and English machine translation of Japanese Publication 11-086844, (35 pages).
JPO Office action dated Feb. 19, 2013, for corresponding Japanese Patent application 2011-016155, (3 pages).
Patent Abstracts of Japan, and English machine translation of Japanese Publication 2008-130458 (56 pages).
European Search Report dated Sep. 2, 2010, for European Patent application 10165968.8, 7 pages.
European Search Report dated Sep. 2, 2010, for European Patent application 10165931.6, 7 pages.
KIPO Office action dated Jul. 29, 2011 for Korean Patent application 10-2009-0115134, 5 pages.
KIPO Notice of Allowance dated Mar. 15, 2012, for Korean Patent application 10-2009-0115134, 5 pages.
U.S. Office action dated Aug. 23, 2010, for cross reference U.S. Appl. No. 12/610,214 , 9 pages.
U.S. Office action dated Dec. 1, 2010, for cross reference U.S. Appl. No. 12/610,214, 10 pages.
U.S. Office action dated Feb. 4, 2011, for cross reference U.S. Appl. No. 12/610,210, 15 pages.
U.S. Office action dated Mar. 31, 2011, for cross reference U.S. Appl. No. 12/610,214, 11 pages.
U.S. Notice of Allowance dated Jul. 22, 2011, for cross reference U.S. Appl. No. 12/610,214, 9 pages.
U.S. Office action dated Aug. 4, 2011, for cross reference U.S. Appl. No. 12/610,210, 14 pages.
English machine translation of Japanese Publication 2002-093402, 14 pages.
Patent Abstracts of Japan, and English machine translation of Japanese Publication 2003-142068, 10 pages.
Patent Abstracts of Japan, and English machine translation of Japanese Publication 2006-222077, 26 pages.
Korean Patent Abstracts for Publication No. 1020060092445, corresponding to Korean Patent 10-0875607.
Korean Patent Abstracts for Publication No. 1020080019311, corresponding to Korean Patent 10-0905390.

* cited by examiner

RECHARGEABLE BATTERY

CROSS-REFERENCE TO RELATED APPLICATION

This application claims the benefit of U.S. Provisional Application No. 61/305,888, filed on Feb. 18, 2010, in the United States Patent and Trademark Office, the disclosure of which is incorporated herein in its entirety by reference.

BACKGROUND

1. Field

One or more embodiments of the present invention relate to a secondary battery.

2. Description of Related Art

Secondary batteries are rechargeable batteries that can be charged and discharged, unlike primary batteries that cannot be recharged. Secondary batteries are widely used in high-technology electronic devices, such as cellular phones, laptops, and camcorders, and are also used for cars.

Secondary batteries typically include an electrode assembly and an electrolyte. The electrode assembly includes a positive plate, a negative plate, and a separator. The electrolyte mostly includes a lithium ion. The positive plate and the negative plate of the electrode assembly may each include an electrode tap protruding from the electrode assembly.

The electrode assembly is accommodated inside a case, and an electrode terminal may be exposed outside the case. The electrode tap that protrudes from the electrode assembly may be electrically coupled to the electrode terminal. The case may have a cylindrical shape or an angular shape.

Secondary batteries may be used in harsh environments, such as an environment that may cause crushing or a shock. Accordingly, stability and reliability of secondary batteries must be high even in such harsh environments.

SUMMARY

One or more embodiments of the present invention include a secondary battery that has high stability and reliability for preventing explosion in a pressurized environment due to a crushing force or a shock.

According to one or more embodiments of the present invention, a secondary battery includes an electrode assembly comprising a first electrode plate, a second electrode plate, and a separator located between the first and second electrode plates; a case housing the electrode assembly; and at least one short circuit inducing member, electrically coupled to the first electrode plate or the second electrode plate of the electrode assembly and adapted to induce a short circuit in the rechargeable battery when the shape of the rechargeable battery is changed.

In one embodiment, the secondary battery includes a first short circuit inducing member electrically coupled to the first electrode plate and a second short circuit inducing member electrically coupled to the second electrode plate and wherein the first short circuit inducing member is configured to contact the second short circuit inducing member to induce a short circuit in the rechargeable battery. In one embodiment, the first short circuit inducing member is spaced from the second short circuit inducing member.

The rechargeable battery may also include a lead member between the electrode assembly and the at least one short circuit inducing member to electrically couple the electrode assembly to the at least one short circuit inducing member. In one embodiment, the lead member is integral with the at least one short circuit inducing member and the at least one short circuit inducing member includes an extension portion fixed to the lead member and a contact portion extending from the extension portion, and configured to induce a short circuit when making contact with another one of the at least one short circuit inducing member.

According to one or more embodiments of the present invention, a secondary battery may have high stability and reliability by preventing explosion in a pressurized environment due to a crushing force or a shock.

DETAILED DESCRIPTION

Reference will now be made in detail to embodiments, examples of which are illustrated in the accompanying drawings.

Figure 1:
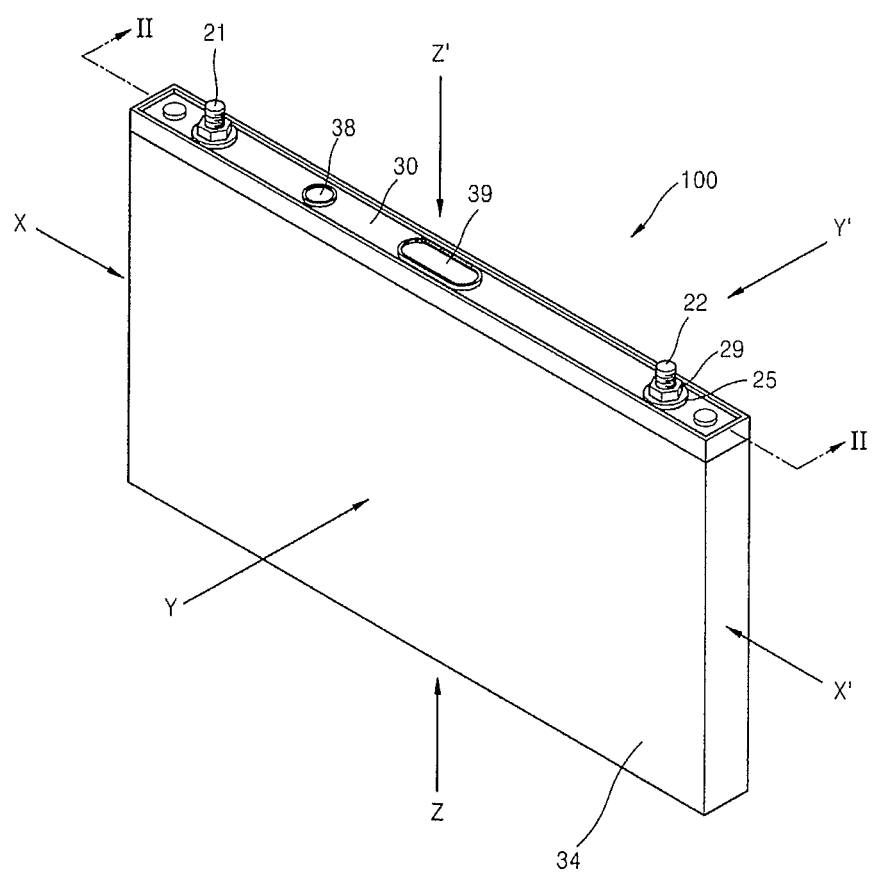
FIG. 1 a perspective view of a secondary battery according to an embodiment of the present invention.
Figure 2:
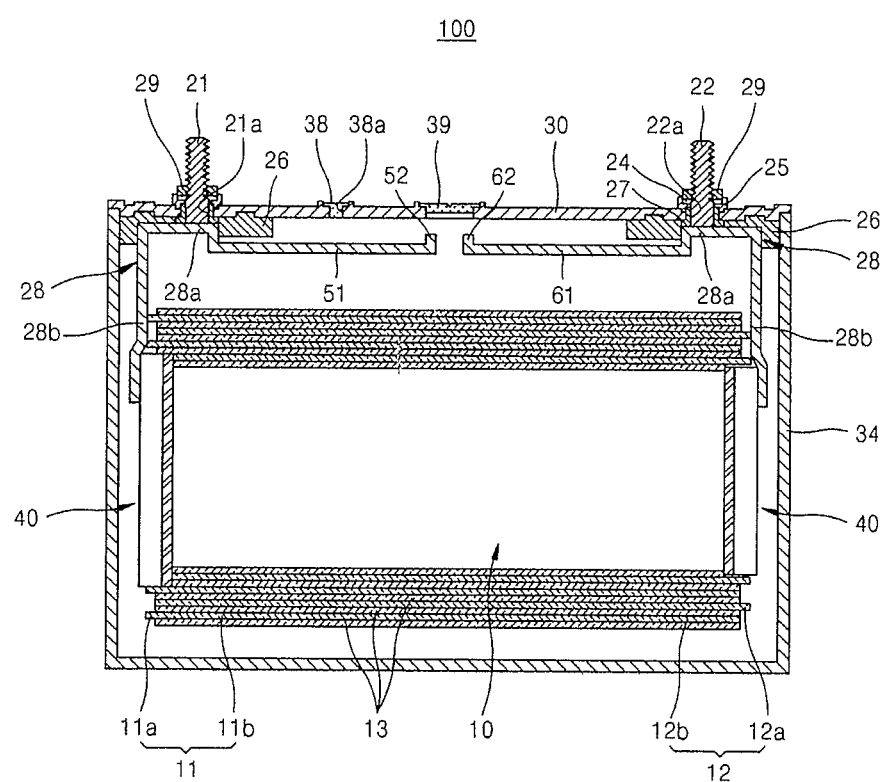
FIG. 2 is a cross-sectional view taken along a line II-II of FIG. 1.

FIG. 1 is a perspective view of a secondary battery 100 according to an embodiment of the present invention, and FIG. 2 is a cross-sectional view taken along a line II-II of FIG. 1.

Referring to FIGS. 1 and 2, the secondary battery 100 includes an electrode assembly 10, electrode terminals 21 and 22, a cap plate 30, a case 34, and short circuit inducing members 50 and 60. Here, the secondary battery 100 may be a lithium-ion secondary battery having an angular shape.

In the electrode assembly 10, a separator 13 constituting an insulator is located between an anode plate 11 and a cathode plate 12, and the anode plate 11, the cathode plate 12, and the separator 13 are wound together. The electrode assembly 10 is accommodated inside the case 34. The electrode terminals 21 and 22 respectively include an anode terminal 21 and a cathode terminal 22. The anode terminal 21 and the cathode terminal 22 are respectively electrically coupled to the anode plate 11 and the cathode plate 12 of the electrode assembly 10, and are exposed to the outside of the case 34. The cap plate 30 is combined with the open side of the case 34.

The short circuit inducing members 50 and 60 are installed inside the case 34, and are short-circuited due to a threshold external pressure applied to the case 34. In other words, when a threshold external pressure is applied by a crushing force or a shock, the short circuit inducing members 50 and 60 electrically short-circuit the anode and the cathode.

The short circuit inducing members 50 and 60 include an anode short circuit inducing member 50 and a cathode short circuit inducing member 60. The anode short circuit inducing member 50 is electrically coupled to the anode plate 11 and the cathode short circuit inducing member 60 is electrically coupled to the cathode plate 12. When an external pressure is applied, the anode short circuit inducing member 50 and the cathode short circuit inducing member 60 may contact each other to be electrically short-circuited.

The short circuit inducing members 50 and 60 may be located in a space between the electrode assembly 10 and the cap plate 30 in the case 34. Accordingly, when the case 34 transforms due to pressure, the short circuit inducing members 50 and 60 inside the case 34 induce a short.

During the short, the anode plate 11 and the cathode plate 12 are electrically coupled via the short circuit inducing members 50 and 60. The short circuit inducing members 50 and 60 may be formed of a material having very low electric resistivity. Accordingly, the short circuit inducing members 50 and 60 generate minimal heat during the short circuit, and quickly allow a large current to pass therethrough.

Accordingly, the short circuit inducing members 50 and 60 prevent or reduce the likelihood of the secondary battery 100 exploding or igniting due to an external shock or a crushing force, and thus stability and reliability of the secondary battery 100 are obtained.

During crushing or a shock, the case 34 may be pressurized in at least one direction of an X-X', Y-Y', and Z-Z' direction illustrated in FIG. 1. Accordingly, the short circuit inducing members 50 and 60 may be configured to be short-circuited due to pressure applied in various directions.

The electrode assembly 10 includes the anode plate 11, the cathode plate 12, and the separator 13. Here, the separator 13 constituting an insulator is between the anode plate 11 and the cathode plate 12, and the anode plate 11, the cathode plate 12, and the separator 13 are wound to form the electrode assembly 10.

The anode plate 11 includes an uncoated portion 11a and a coated portion 11b, and the cathode plate 12 includes an uncoated portion 12a and a coated portion 12b. The coated portion 11b and 12b are portions on which an active material is coated on the current collecting body. The uncoated portions 11a and 12a are portions on which an active material is absent.

The uncoated portion 11a is formed on one side end of the anode plate 11 along a lengthwise direction of the anode plate 11, and the uncoated portion 12a is formed on one side end of the cathode plate 12 opposite the one side end of the anode plate 11, along a lengthwise direction of the cathode plate 12.

Figure 3:
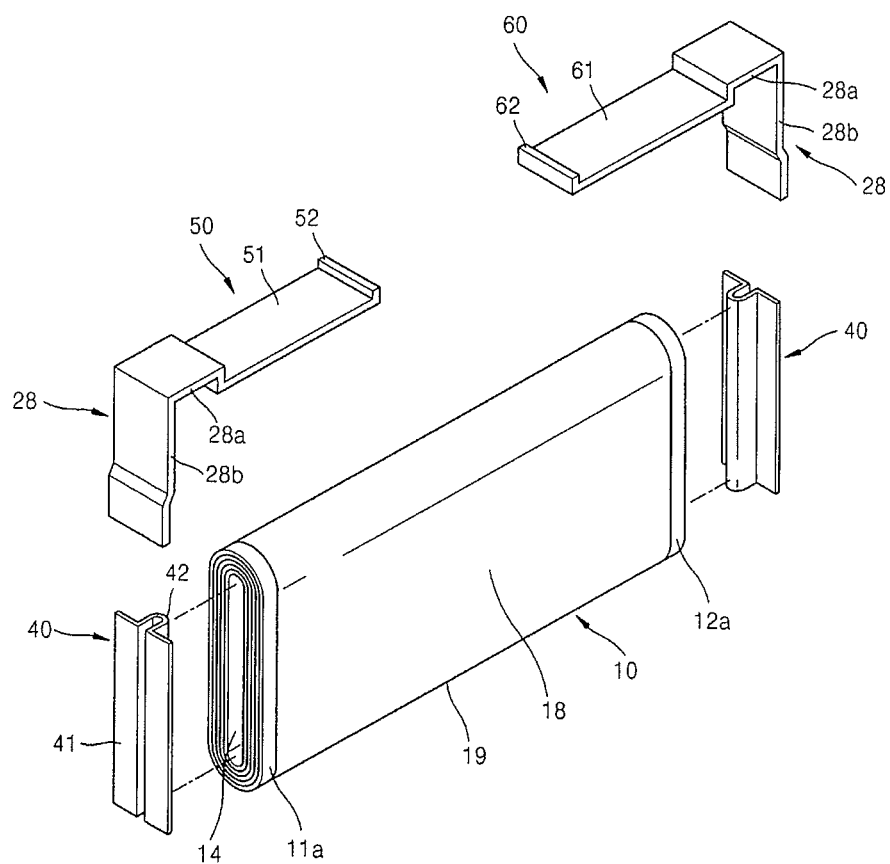
FIG. 3 is a partial exploded perspective view of the secondary battery of FIG. 1, wherein a view of a short circuit inducing member is exploded.

Meanwhile, the electrode assembly 10 may be formed by pressing the anode plate 11, the cathode plate 12, and the separator 13 that are wound to form a cylinder. Here, the electrode assembly 10 may be pressed in a plate shape to have a flat portion 18 and a curved portion 19, as shown in FIG. 3.

The flat portion 18 may be formed as a circumferential surface of the electrode assembly 10 is flattened by pressing the anode plate 11, the cathode plate 12, and the separator 13 that are wound to form a flat shape. The curved portion 19 may be formed as circumferential surfaces of the electrode assembly 10 are curved at each end of the flat portion 18.

The case 34 may be an angular cap shape having one open side. The electrode assembly 10 may be accommodated inside the case 34 with an electrolyte, through the open side of the case 34. The cap plate 30 covers the case 34 while the electrode terminals 21 and 22 protrude to the outside of the case 34 through the cap plate 30. A boundary between the case 34 and the cap plate 30 is welded by using a laser, and thus the case 34 accommodating the electrode assembly 10 and the electrolyte is sealed.

The cap plate 30 may be formed of a thin plate. The cap plate 30 may include an electrolyte injecting hole 38a through which the electrolyte is injected. A sealing plug 38 may be inserted into the electrolyte injecting hole 38a. Also, the cap plate 30 may include a vent member 39 having a groove that may rupture due to internal pressure.

The cap plate 30 may include terminal holes 21a and 22a formed by penetrating the cap plate 30. The terminal holes 21a and 22a may respectively include an anode terminal hole 21a and a cathode terminal hole 22a. The anode terminal 21 may protrude to the outside of the case 34 through the anode terminal hole 21a. The cathode terminal 22 may protrude to the outside of the case 34 through the cathode terminal hole 22a.

Upper and lower gaskets 25 and 27 may be located between the cap plate 30 and the electrode terminals 21 and 22 to insulate the cap plate 30 and the electrode terminals 21 and 22. Here, the electrode terminals 21 and 22 include the anode terminal 21 and the cathode terminal 22.

The lower gasket 27 is installed in the terminal holes 21a and 22a and is located on an interior-facing surface of the cap plate 30, and the upper gasket 25 is installed on top of or on an exterior-facing surface the cap plate 30. A washer 24 is installed on the upper gasket 25 to absorb a clamping force. A screw thread may be formed on each of the anode terminal 21 and the cathode terminal 22 to be fastened with a nut 29. The nut 29 supports the electrode terminals 21 and 22.

Alternatively, the electrode terminals 21 and 22 may be a rivet type. Here, a part of each of the electrode terminals 21 and 22 protrudes from the case 34 through the terminal holes 21a and 22a, and the protruding parts of the electrode terminals 21 and 22 may be pressurized to be widely flattened while the upper gasket 25 is inserted between the terminal holes 21a and 22a and the protruding parts, so as to fix the electrode terminals 21 and 22 to the cap plate 30.

A current collecting plate 40 may be attached to the uncoated portion 11a of the electrode assembly 10 by using welding. The current collecting plate 40 is electrically coupled to the anode terminal 21 by a lead member 28. Accordingly, the anode terminal 21 is connected to the anode plate 11 of the electrode assembly 10 through the lead member 28 and the current collecting plate 40.

Also, the current collecting plate 40 may be attached to the uncoated portion 12a of the electrode assembly 10 by welding. The current collecting plate 40 is electrically coupled to the cathode terminal 22 by a lead member 28. Accordingly, the cathode terminal 22 is connected to the cathode plate 12 of the electrode assembly 10 through the lead member 28 and the current collecting plate 40.

An insulating member 26 is installed between the lead member 28 and the cap plate 30. The lead member 28 includes a current collecting lead unit 28b attached to the current collecting plate 40, and a terminal lead unit 28a attached to the electrode terminals 21 and 22.

According to another embodiment of the present invention, the anode terminal 21 or the cathode terminal 22 may omit the upper gasket 25, the insulating member 26, and the lower gasket 27.

For example, the upper gasket 25 and the lower gasket 27 may be omitted from being between the anode terminal 21 and the cap plate 30, and the insulating member 26 may be omitted from being between the lead member 28 of the anode terminal 21 and the cap plate 30.

Here, the anode terminal 21 may contact the cap plate 30 by directly penetrating through the anode terminal holes 21a without the upper gasket 25 and the lower gasket 27. Also, the lead member 28 may directly contact the cap plate 30. In this case, the cap plate 30 and the case 34 have the same polarity as the anode terminal 21.

The secondary battery 100 according to the current embodiment of the present invention may be a lithium-ion battery, but is not limited thereto. Aside from a lithium-ion battery, the secondary battery 100 may be a nickel-cadmium battery, a nickel-hydrogen battery, or other batteries including a lithium battery.

As shown in FIG. 1, the secondary battery 100 may have an angular shape. However, the shape of the secondary battery 100 is not limited thereto, and may have different shapes, such as a cylindrical shape, and a pouch shape.

The short circuit inducing members 50 and 60 may be electrically coupled to the electrode assembly 10 through the lead member 28 and the current collecting plate 40. In other words, the anode short circuit inducing member 50 may be electrically coupled to the anode plate 11 of the electrode assembly 10 through the lead member 28 and the current collecting plate 40. The cathode short circuit inducing member 60 may be electrically coupled to the cathode plate 12 of the electrode assembly 10 through the lead member 28 and the current collecting plate 40.

In addition, the short circuit inducing members 50 and 60 may be formed to be integrated as a single component with the lead member 28. Alternatively, the short circuit inducing members 50 and 60 may be separately manufactured, and then may be coupled to the lead member 28 by using welding.

When external pressure is applied to the case 34, the short circuit inducing members 50 and 60 move together with the lead member 28. As such, the anode short circuit inducing member 50 and the cathode short circuit inducing member 60 may contact each other to be electrically short-circuited.

According to one embodiment, a distance between the anode short circuit inducing member 50 and the cathode short circuit inducing member 60 may be determined in such a way that a shot may be induced according to a certain threshold pressure.

The short circuit inducing members 50 and 60 may be formed of a material having very low electric resistivity, for example copper (Cu), aluminum (Al) and iron (Fe). Here, the short circuit inducing members 50 and 60 may be formed of the same material as the lead member 28.

The anode plate 11, the current collecting plate 40, and the lead member 28 that are electrically coupled to each other may be formed of the same material, for example, Al. In this case, the anode short circuit inducing member 50 may be formed of the same material as the lead member 28 that are integrated therewith or connected thereto by using welding, for example, Al.

The cathode plate 12, the current collecting plate 40 and the lead member 28 that are electrically coupled to each other may be formed of the same material, for example, Cu. Here, the cathode short circuit inducing member 60 may be formed of the same material as the lead member 28 that are integrated therewith or connected thereto by using welding, for example, Cu.

As such, since the short circuit inducing members 50 and 60 are formed of a material having low electric resistivity, the short circuit inducing members 50 and 60 generate minimal heat during a short circuit, and quickly let a large current flow. Accordingly, the short circuit inducing members 50 and 60 prevent or reduce the likelihood of the secondary battery 100 exploding or igniting due to an external shock or crushing, thereby obtaining stability and reliability of the secondary battery 100.

FIG. 3 is a partial exploded perspective view of the secondary battery 100 of FIG. 1, wherein a view of a short circuit inducing member is exploded. In FIG. 3, the view of the short circuit inducing members 50 and 60 are exploded with the electrode assembly 10 and the current collecting plate 40.

The short circuit inducing members 50 and 60 include the anode short circuit inducing member 50 and the cathode short circuit inducing member 60. When external pressure is applied, the anode short circuit inducing member 50 and the cathode short circuit inducing member 60 may contact each other to be electrically short-circuited.

The short circuit inducing members 50 and 60 include extension portions 51 and 61, and contact portions 52 and 62. One end of each of the extension portions 51 and 61 is fixed or connected to the lead member 28. The other end of the extension portions 51 and 61 is respectively integrated with or connected to the contact portions 52 and 62. The contact portions 52 and 62 contact each other when external pressure is applied to the case 34.

The anode short circuit inducing member 50 includes the anode extension portion 51 and the anode contact portion 52, wherein the anode extension portion and the anode contact portion are perpendicular to each other. One end of the anode extension portion 51 is fixed or connected to the lead member 28 of the anode. The other end of anode extension portion 51 is integrated with or connected to the anode contact portion 52.

The cathode short circuit inducing member 60 includes the cathode extension portion 61 and the cathode contact portion 62, wherein the cathode extension portion and the cathode contact portion are perpendicular to each other. One end of the cathode extension portion 61 is fixed or connected to the lead member 28 of the cathode. The other end of the cathode extension portion 61 is integrated with or connected to the cathode contact portion 62.

The anode contact portion 52 and the cathode contact portion 62 are spaced from each other and face each other. The anode contact portion 52 and the cathode contact portion 62 contact each other when a threshold external pressure is applied to the case 34. Pressure that induces a short by the short circuit inducing members 50 and 60 may be calculated at least in part based on a distance between the anode contact portion 52 and the cathode contact portion 62.

To increase the likelihood of accurate contact of the contact portions, a facing area of the anode contact portion 52 and the cathode contact portion 62 may be greater than an area of a cross section of each of the extension portions 51 and 61. Without the anode contact portion 52 and the cathode contact portion 62, even if the anode extension portion 51 and the cathode extension portion 61 are close to each other due to external pressure, they may not contact each other because they are each relatively thin. However, in the secondary battery 100 according to the present embodiment, when external pressure is applied to the case 34, the anode contact portion 52 and the cathode contact portion 62 may easily contact each other due to their increased size. Thus, when an external pressure is applied to the case 34 according to a crushing force or a shock, the short circuit inducing members 50 and 60 may electrically short-circuit the anode and the cathode easily. Thus stability and reliability of the secondary battery 100 are obtained.

The electrode assembly 10 is pressurized flat to form a plate shape after being wound, and may have an internal space 14 in the center. The current collecting plate 40 may include a supporting protrusion 42 that is inserted into the internal space 14, and an attached plate 41 that is welded to the side of the electrode assembly 10 by pressurizing the uncoated portions 11a and 12a.

The supporting protrusion 42 extends from a width direction center of the current collecting plate 40 along a lengthwise direction of the current collecting plate 40. A height of the supporting protrusion 42 may generally correspond to a height of the internal space 14 of the electrode assembly 10.

The supporting protrusion 42 supports the electrode assembly 10 when it is in the internal space 14 of the electrode assembly 10. Accordingly, the supporting protrusion 42 may maintain a sufficient contact between the electrode assembly 10 and the current collecting plate 40 even after an external shock. The supporting protrusion 42 not only supports the electrode assembly 10 in the lengthwise direction of the internal space 14 but also in a width direction, and thus stably supports the electrode assembly 10.

An attached plate 41 may be connected to two ends of the supporting protrusion 42. The attached plate 41 contacts the side ends of the electrode assembly 10, and the uncoated portions 11a and 12a at the side ends of the electrode assembly 10 are pressed. Here, the side ends denote a side surface vertical to a central axis when the electrode assembly 10 is wound.

Accordingly, the attached plate 41 and the uncoated portions 11a and 12a contact each other over a wide area. Also, the attached plate 41 may be attached to the side ends of the electrode assembly 10 by using laser welding. As such, when the laser welding is used, thicknesses of the current collecting plate 40 may be thicker compared to when ultrasonic welding is used, and thus resistance of the current collecting plate 40 may be reduced.

Also, since the current collecting plate 40 is fixed to the sides of the uncoated portions 11a and 12a, an overall output of the electrode assembly 10 may be increased by decreasing the areas of the uncoated portions 11a and 12a and increasing the areas of the coated portions 11b and 12b.

According to the current embodiment of the present invention, stability and reliability of the secondary battery 100 are obtained by preventing an explosion in a pressurized environment according to a crushing force or a shock.

Figure 4:
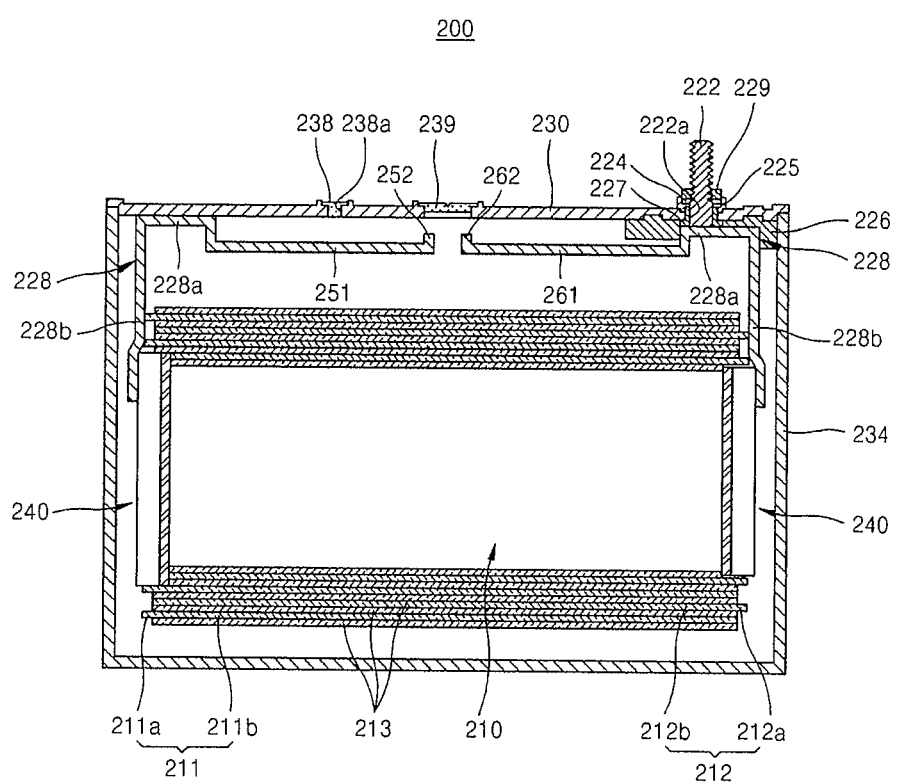
FIG. 4 is a perspective view of a secondary battery according to another embodiment of the present invention.

FIG. 4 is a perspective view of a secondary battery 200 according to another embodiment of the present invention. Compared to the secondary battery 100 of FIG. 2, secondary battery 200 omits an upper gasket 25, an insulating member 26 and an lower gasket 27 that electrically separate an anode plate 211 or a cathode plate 212 from a cap plate 230.

In FIG. 4, elements of the secondary battery 200 which are identical to the secondary battery 100 of FIG. 1 have the same or similar reference numerals as the elements of the secondary battery 100, and detailed descriptions thereof are not repeated.

Referring to FIG. 4, in the secondary battery 200, upper gasket 25, the lower gasket 27, and the insulating member 26 are omitted.

In this case, the cap plate 230 may be the anode. Also, the lead member 228 of the anode terminal may directly contact the cap plate 230. In this case, the cap plate 230 and a case 234 have the same polarity as the anode terminal.

The secondary battery 200 includes an electrode assembly 210; electrode terminals; the cap plate 230; the case 234; and short circuit inducing members 250 and 260.

In the electrode assembly 210, a separator 213 constituting an insulator is located between the anode plate 211 and the cathode plate 212. The case 234 accommodates the electrode assembly 210 therein. The electrode terminals may include the anode terminal and the cathode terminal 222.

The anode terminal and the cathode terminal 222 are respectively electrically coupled to the anode plate 211 and the cathode plate 212 of the electrode assembly 210, and are exposed to the outside of the case 234. The cap plate 230 is combined with the open side of the case 234.

The short circuit inducing members 250 and 260 are installed inside the case 234, and are short-circuited by a threshold external pressure applied to the case 234. The short circuit inducing members 250 and 260 include an anode short circuit inducing member 250 and a cathode short circuit inducing member 260.

The short circuit inducing members 250 and 260 prevent the secondary battery 200 from exploding or igniting due to an external shock or a crushing force, and thus stability and reliability of the secondary battery 200.

The anode plate 211 includes an anode uncoated portion 211a and an anode coated portion 211b. The cathode plate 212 includes a cathode uncoated portion 212a and a cathode coated portion 212b. The anode terminal may be the cap plate 230. The cathode terminal 222 may be formed through a cathode terminal hole 222a to protrude out of the case 234.

The cap plate 230 may include an electrolyte injecting hole 238a. A sealing plug 238 may be inserted into the electrolyte injecting hole 238a. A vent member 239 may be installed in the cap plate 230. The upper gasket 225 and the lower gasket 227 are located between the cap plate 230 and the cathode terminal 222 to insulate the cap plate 230 and the cathode terminal 222 from each other. A washer 224 is installed on the upper gasket 225 to absorb a clamping force. The cathode terminal 222 may include a nut 229. Alternatively, the cathode terminal 222 may be a rivet type.

A current collector plate 240 may be attached to the cathode uncoated portion 212a of the electrode assembly 210 by using welding. The current collector plate 240 is electrically coupled to the cathode terminal 222 by using the lead member 228 as a medium. The insulating member 226 is installed between the lead member 228 and the cap plate 230. The lead member 228 includes a current collector lead portion 228b attached to the current collector plate 240, and a terminal lead portion 228a attached to the cathode terminal 222 or the cap plate 230.

The short circuit inducing members 250 and 260 include extension portions 251 and 261, and contact portions 252 and 262. The anode short circuit inducing member 250 includes an anode extension portion 251 and a cathode contact portion 252. The cathode short circuit inducing member 260 includes a cathode extension portion 261 and a cathode contact portion 262.

The current collector plate 240 may include a supporting protrusion and an attached plate. The supporting protrusion is inserted into an internal space 214 of the electrode assembly 210 so as to support the electrode assembly 210. The attached plate may be connected to two side ends of the supporting protrusion.

Figure 5:
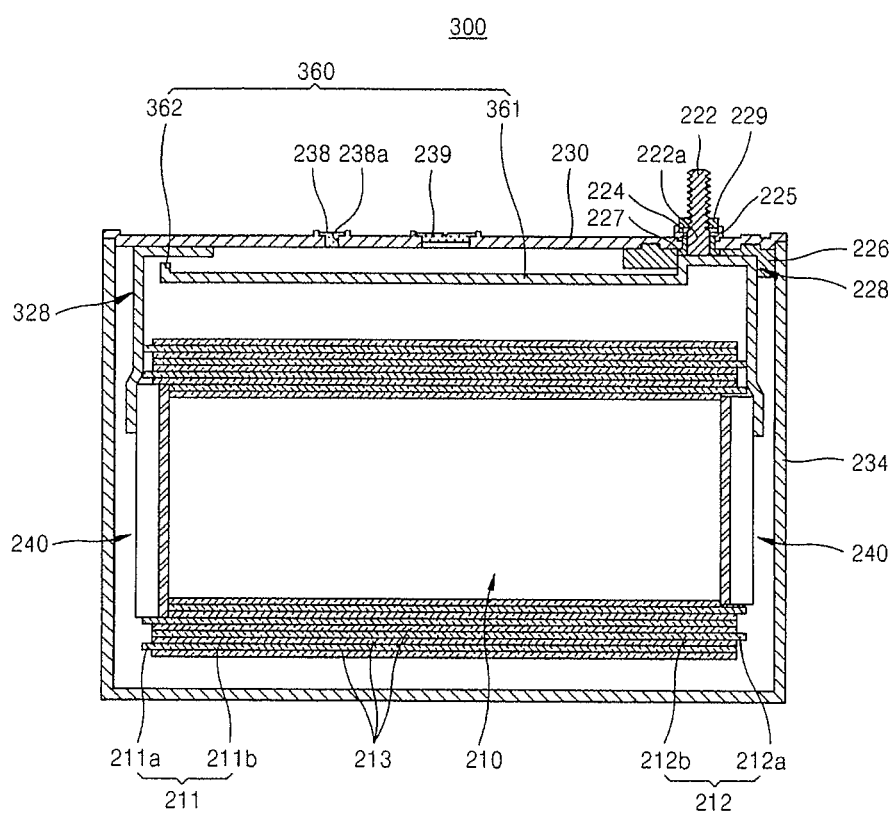
FIG. 5 is a cross-sectional view of a secondary battery according to another embodiment of the present invention.

FIG. 5 is a cross-sectional view of a secondary battery 300 according to another embodiment of the present invention. Compared to the secondary battery 200 of FIG. 4, in the secondary battery 300 according to the current embodiment of the present invention, the anode short circuit inducing member 250 is omitted, and a short circuit inducing member 360 replaces the cathode short circuit inducing member 260.

In FIG. 5, elements of the secondary battery 300 which are substantially similar to the secondary battery 200 of FIG. 4 have same reference numerals as the elements of the secondary battery 200, and detailed descriptions thereof are not repeated.

Referring to FIG. 5, in the secondary battery 300, the short circuit inducing member 360 may be configured to contact a lead member 328 to induce a short circuit due to external pressure applied to the case 234. But, this invention is not limited thereto, the short circuit inducing member 360 may also contact the cap plate 230 or the case 234 to induce a short circuit due to external pressure applied to the case 234.

In this case, the cap plate 230 and/or the case 234 are electrically connected to the anode plate 211 and the cathode plate 212 of the electrode assembly 210 through a lead member 328, and function as an anode terminal or a cathode terminal, respectively, which are exposed to the outside of the case 234. In addition, the short circuit inducing member 360 may be electrically connected to the cathode plate 212 or the anode plate 211 of the electrode assembly 210 through the lead member 228.

In FIG. 5, the cap plate 230 and/or the case 234 are electrically connected to the anode plate 211 of the electrode assembly 210 through the lead member 328, and function as a cathode terminal exposed to the outside of the case 234. The short circuit inducing member 360 may be electrically connected to the cathode plate 212 of the electrode assembly 210 through the lead member 228.

In this case, when a threshold pressure or more is applied to the case 234, the short circuit inducing member 360 may be moved to contact the lead member 328 to induce a short circuit. Thus, the short circuit inducing member 360 prevents an explosion of the secondary battery 300 in a pressurized environment due to a crushing force or a shock, thereby obtaining stability and reliability of the secondary battery 300.

The short circuit inducing member 360 includes an extension portion 361 and a contact portion 362. The extension portion 361 extends from a first end to a second end. The first end of the extension portion 361 may be fixed or connected to the lead member 228, and the second end of the extension portion 361 may be integrally formed with the contact portion 362 or may be separate from and coupled to the contact portion 362.

The contact portion 362 may be moved to contact the lead member 328 when pressure is applied of the case 234. For example, the contact portion 362 may be bent towards the cap plate 230 from the extension portion 361. Thus, when a threshold pressure is applied to the case 234, a short circuit may be easily induced. In this case, when the short circuit inducing member 360 contacts the lead member 328, a short circuit between the anode plate 211 and the cathode plate 212 is induced.

Generally, the greater a distance between the contact portion 362 and the lead member 328, the case 234 or the cap plate 230, the greater the pressure needed to cause a short circuit. In this case, a distance between the contact portion 362 and the lead member 328 may be determined in such a way that a short circuit may be induced according to a desired threshold pressure.

As described above, according to the one or more of the above embodiments of the present invention, stability and reliability of a secondary battery are obtained by preventing explosion in a pressurized environment due to a crushing force or a shock.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A rechargeable battery comprising:
an electrode assembly comprising a first electrode plate, a second electrode plate, and a separator located between the first electrode plate and the second electrode plate;
a case housing the electrode assembly; and
a short circuit inducing member comprising a first short circuit inducing member electrically coupled to the first electrode plate, wherein the first short circuit inducing member is integral as a single component with a first lead member directly coupled to the first electrode plate and an extension portion spaced from the case and extending from the first lead member, and a second short circuit inducing member electrically coupled to the second electrode plate, wherein the second short circuit inducing member is integral as a single component with a second lead member directly coupled to the second electrode plate and an extension portion spaced from the case and extending from the second lead member and towards the extension portion of the first short circuit inducing member such that a short circuit occurs when the extension portico of the first short circuit inducing member contacts the extension portion of the second short circuit inducing member.

2. The rechargeable battery of claim 1, wherein the first short circuit inducing member is spaced from the second short circuit inducing member.

3. The rechargeable battery of claim 1, wherein at least one of the first short circuit inducing member and the second short circuit inducing member further comprises a contact portion extending from the extension portion and configured to contact another one of the first short circuit inducing member and the second short circuit member.

4. The rechargeable battery of claim 3, wherein the contact portion is substantially perpendicular to the extension portion.

5. The rechargeable battery of claim 1, wherein at least one of the first and second short circuit inducing members and one of the first or second lead members comprise the same material.

6. The rechargeable battery of claim 1, wherein the first electrode plate, at least one of the first and second short circuit inducing members, and one of the first or second lead members comprise the same material.

7. The rechargeable battery of claim 1, wherein at least one of the first and second short circuit inducing members comprises a material having low electric resistance.

8. The rechargeable battery of claim 1, wherein at least one of the first and second short circuit inducing members comprises copper, aluminum or iron.

9. The rechargeable battery of claim 1, further comprising a cap plate coupled to the case, wherein the first electrode plate or the second electrode plate is electrically coupled to the cap plate.

10. The rechargeable battery of claim 1, wherein at least one of the first and second short circuit inducing members is configured to contact the case to induce a short circuit in the rechargeable battery.

11. The rechargeable battery of claim 1, wherein at least one of the first and second short circuit inducing members is configured to induce the short circuit in the rechargeable battery when an external effect causes the shape of the rechargeable battery to be changed.

12. The rechargeable battery of claim 1, wherein the rechargeable battery is configured to be used for cars.

* * * * *